United States Patent [19]
Stanley

[11] Patent Number: 5,939,012
[45] Date of Patent: Aug. 17, 1999

[54] METHOD AND APPARATUS FOR MANUFACTURE OF CARBONACEOUS ARTICLES

[75] Inventor: Earl K. Stanley, Naples, Fla.

[73] Assignee: Globe Metallurgical, Inc., Cleveland, Ohio

[21] Appl. No.: 08/989,637

[22] Filed: Dec. 12, 1997

[51] Int. Cl.⁶ ..................................................... B29C 35/14
[52] U.S. Cl. .................. 264/472; 264/29.1; 264/29.7; 264/40.1; 264/40.6; 264/40.7; 264/211.11; 425/135; 425/144; 425/174.8 R; 425/378.1
[58] Field of Search .................................. 264/29.1, 29.7, 264/40.1, 40.6, 40.7, 211.11, 452, 464, 472; 425/135, 144, 174.8 R, 378.1; 204/286, 294; 373/89

[56] References Cited

U.S. PATENT DOCUMENTS

| | | |
|---|---|---|
| 1,442,031 | 1/1923 | Soderberg . |
| 1,836,880 | 12/1931 | Sem . |
| 2,159,183 | 5/1939 | Sem . |
| 2,224,739 | 12/1940 | Manfredini . |
| 2,680,141 | 6/1954 | Waddington et al. . |
| 3,254,143 | 5/1966 | Heitman ............................... 264/472 X |
| 3,280,231 | 10/1966 | Bentolila et al. . |
| 3,284,372 | 11/1966 | Bailey . |
| 3,524,004 | 8/1970 | Nostran et al. . |
| 3,783,170 | 1/1974 | Kolano . |
| 3,819,841 | 6/1974 | Persson . |
| 4,396,482 | 8/1983 | Das et al. . |
| 4,514,371 | 4/1985 | Jamet et al. . |
| 4,517,139 | 5/1985 | Rawlings et al. . |
| 4,527,329 | 7/1985 | Bruff et al. . |
| 4,575,856 | 3/1986 | Persson . |
| 4,576,004 | 3/1986 | Bach . |
| 4,597,839 | 7/1986 | Josefowicz . |
| 4,612,151 | 9/1986 | Bruff et al. . |
| 4,701,316 | 10/1987 | Lester et al. . |
| 4,756,004 | 7/1988 | Stanley et al. . |
| 4,756,813 | 7/1988 | Stanley . |
| 4,921,222 | 5/1990 | Mott . |
| 4,942,002 | 7/1990 | Feist . |
| 5,110,359 | 5/1992 | Orac et al. . |

FOREIGN PATENT DOCUMENTS

| | | |
|---|---|---|
| 646310 | 7/1928 | France . |
| 2394957 | 6/1977 | France . |
| 1050465 | 9/1956 | Germany . |
| 1097058 | 1/1961 | Germany . |
| 2521873 | 5/1975 | Germany . |
| 32041 | 3/1921 | Norway . |
| 32259 | 5/1921 | Norway . |
| 58982 | 2/1938 | Norway . |
| 72898 | 12/1947 | Norway . |
| 80735 | 9/1952 | Norway . |
| 101917 | 4/1941 | Sweden . |
| 209233 | 6/1940 | Switzerland . |
| 1269676 | 12/1969 | United Kingdom . |

*Primary Examiner*—Leo B. Tentoni
*Attorney, Agent, or Firm*—Dickinson Wright PLLC

[57] ABSTRACT

A carbonaceous article is made by baking paste under continuously applied high pressure. The paste is extruded as it is baked to form the article, and the article may be further machined after baking. A force opposing extrusion is applied to the article to allow high pressures to be provided to the paste. The location of the baking zone both longitudinally and peripherally is carefully controlled to preclude over or under baking. Longitudinal control of the baking zone is effected by measuring the force required to extrude baked paste, and peripheral control is effected by measuring the extent of the baking at several peripheral locations and controlling the baking current at these locations. The article may be an electrode for supply to an electric arc furnace immediately after baking or to a furnace remote from the baking station. The article may also be converted to graphite by heating the article to a graphitizing temperature, and the additional heat may be provided by electric resistance heating or by induction heating.

53 Claims, 3 Drawing Sheets

5,939,012

METHOD AND APPARATUS FOR MANUFACTURE OF CARBONACEOUS ARTICLES

TECHNICAL FIELD

This invention relates to the art of carbonaceous articles and their manufacture. In the preferred embodiments, the invention relates to methods and apparatus for the manufacture of carbon and graphite electrodes from carbonaceous, self-baking electrode paste.

BACKGROUND ART

Self-baking electrodes are known. This type of electrode is made by baking a carbonaceous paste in conjunction with operation of an electric arc furnace, which receives the baked electrode. An early such electrode is shown in U.S. Pat. No. 1,442,031 (Soderberg), which includes a container for holding electrode paste and bakes the paste by heating it. Unbaked electrode paste cannot carry a large electric current, but the baked paste is capable of carrying substantial electrical current and is used for supplying the large amounts of electric current required for operation of electric arc furnaces. Applicant's prior U.S. Pat. No. 4,756,813 teaches a self-baking electrode wherein electric current, both for operating a furnace and baking the paste, is supplied to the paste through a centrally-located mandrel. U.S. Pat. No. 3,524,004 (Van Nostran et al.) also shows supply of electric current to the center of the electrode to bake the paste and supply of a portion of the current required by the furnace to the exterior of the electrode. U.S. Pat. No. 4,527,329 (Bruff) shows a process for manufacture of a furnace electrode in situ where heat for baking the paste is supplied independently of the current operating the furnace.

Further, it is known to extrude a self baking electrode by application of pressure to the electrode paste, as shown in applicant's prior U.S. Pat. No. 4,756,004. While the structure shown in this patent is useful, the baked electrode is susceptible to inadequate baking on the one hand and becoming stuck in the housing on the other.

Known methods for making self-baking electrodes have not been successful, primarily because of the difficulties arising from the interaction between the baking zone and the various parts of the baking apparatus. The Van Nostran apparatus, for example, uses a screw to advance the baked paste, but strong adherence between the screw and the baked paste eventually results in an inability to continue advancing the electrode and consequent failure. Similarly, production of self baking electrodes in accordance with applicant's prior patents has been problematic because of the adhesion between the baked paste and the paste container.

SUMMARY OF THE INVENTION

In accordance with a first aspect of the invention, carbonaceous articles are made by baking and extruding "self-baking" carbonaceous paste independently of a furnace. These articles are preferably electrodes for electric arc furnaces but may be electrodes for electrolytic refining of metals, such as aluminum, or articles for a variety of other purposes. Manufacture of carbonaceous articles independent of a furnace has several advantages including the ability to bake the articles without concern for the immediate operating requirements of the furnace and the ability to locate the manufacturing facility remote from the furnace. (The term "baked paste" is used herein to mean paste that has achieved at least the rigidity required to maintain its shape, but which may be considered only partially baked because volatile components in an amount greater than about one percent remain. The term "unbaked paste" is used to refer to paste that is not capable of maintaining its shape outside the paste container.)

The articles are baked and extruded in basically the desired shape for final use and then machined, if necessary, to the final shape. The finished articles are moved to the desired location and used in the known manner. A baking facility is generally capable of making electrodes at a rate greater than that required by a single electric arc furnaces, which means that the electrodes so made may be used to supply a plurality of furnaces. Similarly, articles designed for use in other processes, such as electrodes for electrolytic refining, are made in proportion to the rate of use that is most economical.

When a carbonaceous article is fully baked in the baking station it can be further processed for use, for example, by detaching the article from the remainder of the extrusion. If the article has not been fully baked in the baking station, it may be baked further by application of heat by known techniques. For example, the baked paste may be supplied with electric current by an electric circuit separate from that which supplies the baking current, whereby the article is further heated by resistance heating ($I^2R$ heating). Preferably, however, the baked article is further heated inductively by passing it through induction coils. Other heating devices, such as a gas heater may also be useful in some circumstances. When the partially baked article is used as an electrode in an electric arc furnace, the paste may be additionally baked by furnace current supplied through the electrode or by heat from the furnace.

In accordance with another embodiment of the invention, baked paste is converted to graphite by heating the paste to a high temperature (2500° C. or greater) and holding it at the elevated temperature. This is accomplished, preferably, by passing the electrode through an induction coil where it is heated inductively. Paste maintained at this high temperature must be insulated to prevent the loss of heat. The insulating material, which is preferably carbon black, is supported around the electrode by a cylindrical tube made of inductively-transparent materials, such as those described in U.S. Pat. No. 4,921,222 (Mott).

Conversion of the baked paste to graphite is preferably done as the paste exits the container where the initial baking is done to obviate cooling and consequent reheating of the article. Alternatively, however, articles may be converted to graphite at a separate location. The additional heat is preferably provided by induction, and when the conversion is done as the paste exits the baking container, the induction coil and insulating structure are contiguous to the container. If the conversion is done in a remote location, the coil and insulating structure may receive a single article or be large enough to receive a number of articles simultaneously.

Applicant has discovered that a primary cause of problems in extrusion of baked articles is excessive adhesion between the baked paste and the structure containing the unbaked paste, such as the paste container and the central conductor, or mandrel. This adhesion results from the inability to control the size or location of the baking zone in the paste. Thus, when a central electrode is employed to provide the baking current, the baking zone should be located close to the tip of the central electrode. Movement of the baking zone away from the tip of the electrode, toward the exit end of the paste container, results in insufficient baking and consequent risk of break-out of green paste into the tubular cavity formed in the paste by the electrode. If the baking zone moves in the opposite direction, away from exit end of the paste container, the baked carbon will hang up in the container and prevent further extrusion. Thus, it is an objective of this invention to provide methods and apparatus for controlling the position of the baking zone whereby the paste is properly baked but does not interfere with extrusion of the baked paste.

In accordance with a preferred embodiment of the invention, changes in the longitudinal location of the baking zone are detected by measuring changes in the force required to extrude the article. An increase in the force required to extrude an article indicates that the baking zone is growing, or moving away from the exit of the paste container. Conversely, a decrease in the required extrusion force indicates that the baking zone is shrinking, or moving toward the end of the paste container. Changes in the required extrusion force are detected in the preferred embodiment by detecting a decrease in the extrusion, or "slipping" rate when holding the extrusion force steady. If the baking energy is also steady, a decrease in the slipping rate will result in an excessive baking rate because the baking energy required is a function of the slipping rate. This imbalance can be corrected by decreasing the baking rate or by increasing the slipping rate, or both. In the preferred embodiment, predetermined baking and slipping rates are determined at the outset, and small corrections are made during baking by adjusting the extrusion force to adjust the slipping rate while holding the baking energy steady.

Changes in the force required to extrude the baked paste may be measured by various techniques. In the preferred embodiment, a load cell is held to the baked article by a moving support element, which is preferably a rod or shaft of a hydraulic cylinder, ball screw mechanism, or other device that provides an element capable of programmed motion. In the preferred embodiment, the shaft engages the bottom of the extruded article, and the load cell is held between the two. The load cell may be placed in other locations, however, such as the periphery of the article, if the shaft engages the periphery. The shaft is driven to move at the expected slipping rate, and an increase in the force detected by the load cell indicates that the baked article is moving toward the shaft faster than the shaft is receding. This, in turn indicates that the adhesion forces have decreased and that the baking zone is shrinking. Decreases in the force detected by the load cell indicate the converse. In the embodiment where the article is extruded by application of pressure to the paste, a control circuit is provided to adjust the paste pressure applied by the paste pump until the rate of extrusion again matches the speed of the shaft. If the article is extruded by another technique, such as by the screw shown in the Van Nostran patent, the extrusion mechanism, e.g., the motor driving the screw, is controlled.

If small changes in the paste pressure do not reestablish the desired position of the baking zone, the speed of the shaft, the input baking energy, the extruding forces, or all of these may be adjusted.

The slipping rate may, of course, be measured in other ways, such as optically, electrically, or mechanically.

In accordance with yet another aspect of the invention, the moving shaft applies a significant force to the article in a direction opposing extrusion. Thus, the extrusion forces must overcome the sum of the adhesion forces and the opposing force. The advantage of such a system when extrusion is caused by paste pressure is that the pressure can be higher than that required to overcome the adhesion forces by an amount that depends on the magnitude of the opposing force. Baking the paste under continuously-applied higher pressure has been found to produce an article superior to those previously obtained. Preferably, the pressure in the paste is at least about 70 psi. The resulting carbon article is denser, stronger, and lower in resistivity, because the paste is compacted by the high pressures, and the gasses are cracked in the pores of the article at higher pressure.

Applicant has discovered that carbon paste has a tendency to bake unevenly in the peripheral direction and that this complicates the extrusion process and results in an inferior product. Uneven baking occurs during resistance heating because the resistivity of the paste decreases as the paste bakes. In the embodiment where the baking current flows between a central electrode, or mandrel, and a peripheral electrode, the paste in the paths initially carrying higher current, for any reason, will bake faster, resulting in lower resistivities in those paths and drawing yet more current. Thus, the paste lying in those paths will be preferentially baked, and the remaining parts of the paste will be incompletely baked. This asymmetry is corrected in the preferred embodiment by providing a plurality of spaced, peripheral electrodes and a control circuit for adjusting the current flowing from the central electrode to each respective peripheral electrode. The magnitude of the current flowing in the individual paths can be determined in any of several ways, such as by measuring the temperature of the paste adjacent each of the electrodes, relatively higher temperatures indicating faster baking. In addition, the central electrode itself is preferably divided into segments, e.g., four segments, to provide more precise control of the current and to decrease the time required to alter the baking pattern. In this embodiment, the control circuit adjusts the current flowing among the segments of the central electrode and the individual electrodes on the periphery of the baking zone to control accurately the peripheral location of the baking zone.

DETAILED DESCRIPTION OF THE INVENTION

Figure 1:
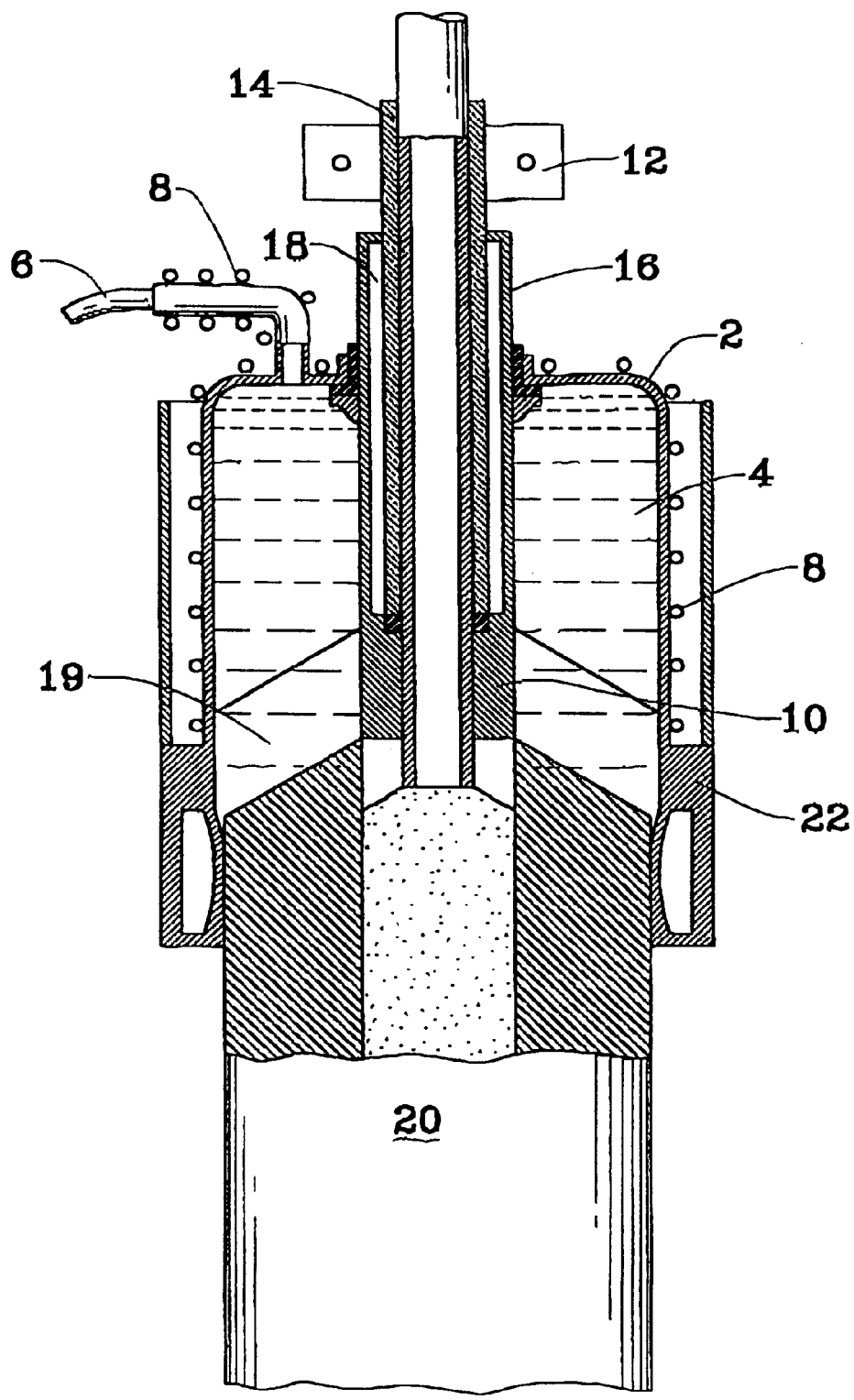
FIG. 1 is a vertical cross section of a prior art self-baking electrode.

FIG. 1 illustrates a portion of a prior art self-baking electrode, such as that shown in U.S. Pat. No. 4,756,004. A pressure container illustrated as a vessel 2 is supplied with self-baking paste 4 through an inlet shown as a supply tube 6. The supply tube and pressure vessel are heated by any known means, illustrated in the drawings as steam tubes 8, to maintain the temperature of the paste whereby it can flow through the tube and into the vessel. Electric current is supplied to the paste in the vessel through a conductor 10, which is connected to a power bus 12 by a cylindrical bus 14. The cylindrical bus is water-cooled and includes an outer casing 16 to provide a water jacket 18. Current flows from the conductor 10 through the paste to form a baking zone 19, and the lower end of the container forms an exit through which a baked portion 20 of the electrode exits the vessel. The lower end of the vessel includes a support band 22, which may be formed in any of several know ways. The support band 22 supports a portion of the weight of the electrode and is adjustable to allow the electrode to advance at the desired rate in response to the weight of the electrode and the force applied by the pressurized paste.

Figure 2:
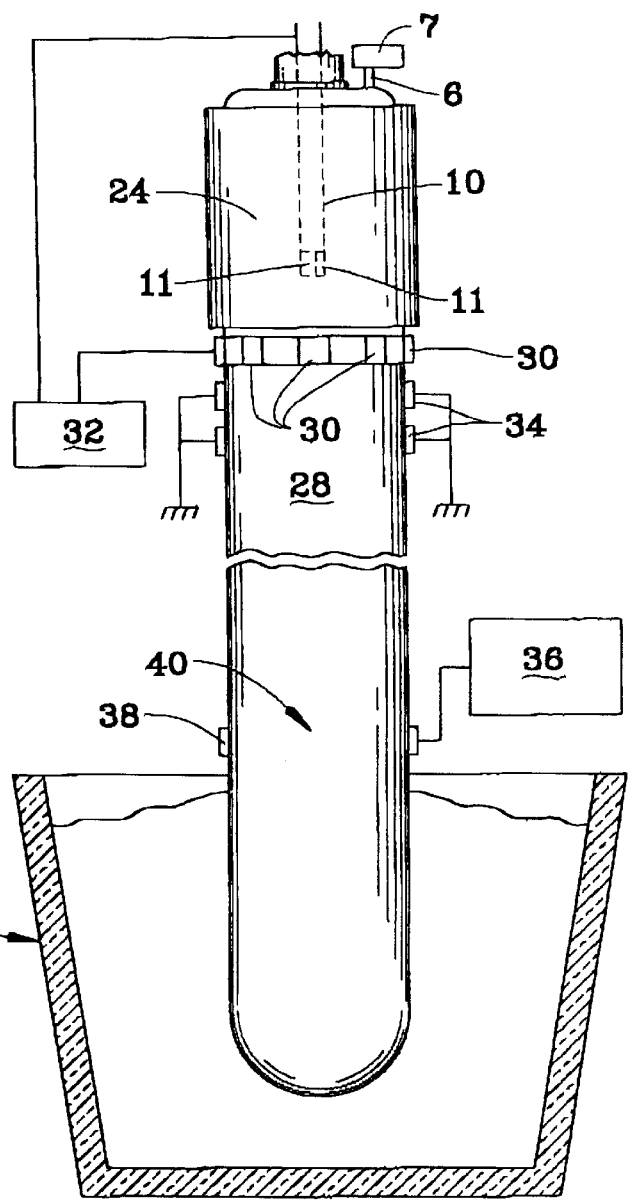
FIG. 2 is a side view of an apparatus for producing an electrode in accordance with the invention by using electric resistance means for additional heating of the partially-baked electrode portion and also illustrating use of the electrode so made with a furnace.

FIG. 2 illustrates an embodiment of the invention for making an electrode for use in an electric arc furnace. A pressure baking vessel 24 similar to that shown in FIG. 1 is supported above a metallurgical electric-arc furnace 26 such that an extruded electrode 40 is directed into the furnace for supplying electric current to create the arc during operation of the furnace. The paste is supplied to the pressure vessel through inlet 6 by a pump 7, and the pressure of the paste extrudes baked paste 28 through the outlet formed by the end of the vessel. The paste is heated by conduction of current between each conducting segment 11 of the centrally-located mandrel electrode 10 and respective ones of the peripherally located electrodes 30. The baking current flowing through the paste between the mandrel 10 and the electrodes 30 is controlled by controller 32. The electrode 40 is supported by any of several known means, this embodiment illustrating the use of slipping shoes 34 to support the electrode. These slipping shoes serve the same general purpose as does the support band 22 in FIG. 1 and include a stationary set of shoes and a moving set as known in the art. The moving shoes move with the electrode as it slips, and the fixed shoes support the electrode while the moving shoes reset positions.

The slipping shoes and the support band can be controlled whereby the vertical motion of the electrode can be monitored by instruments mounted on these elements. Thus, the grip of the band 22 and the rate of motion of the slipping shoes 34 will determine the vertical motion of the baked electrode. As will be described in detail below, the invention includes precise measurement of the vertical motion of the electrode and feedback to the pressure pump 7 to control the location of the baking zone. Further, the invention includes application of a significant force resisting extrusion of the electrode to allow use of larger pressures during baking, and the band 22 or the slipping shoes can be controlled to provide this force.

The main electric power for operation of the furnace is provided by the power supply 36, which, for example, provides 10 megawatts of electric power through contacts 38 for conduction through baked paste 40 and into the furnace. It will be appreciated that because the electric circuit having controller 32 is separate from the electric circuit having the power supply 36, the two systems may be operated separately to provide the desired degree of baking in the upper part of the electrode and the necessary current for operation of the furnace.

The electrode in FIG. 2 is baked by the current provided by controller 32. If the baking is not complete in that too many volatile components remain, heat from the furnace 26 or current provided by the main power supply 36 will provide further baking.

The baking is often not even about the periphery of the electrode. This asymmetry indicates that the individual baking zones corresponding to respective electrodes 30 are not equidistant from the end of the pressure vessel 2. In the embodiment shown, the controller includes a separate controller for each of the eight electrodes 30, which are evenly spaced about the periphery of the electrode portion 28.The individual controllers, for example, halmar controllers, control the current flowing through each of the individual electrodes. Thus, in addition to controlling the overall amount of current passing through the electrode paste, the controller 32 further ensures that the baking current is evenly distributed throughout the paste by adjusting the current flowing to each of the individual electrodes to avoid uneven baking of the electrode. In the preferred embodiment the controller accomplishes this by including a thermocouple as a part of the electrode 30 to monitor the temperature of the baked electrode at each of the individual electrodes 30. The controller then adjusts the current flowing through that electrode to cause the baking to be even throughout the electrode.

For example, if it is desired to provide baking heat generated by at least 2400 amperes flowing through the baking zone, a controller capable of controlling current in the range of zero to 1000 amperes can be used for each of the electrodes 30. This means that the desired 2400 amperes can be provided by 800 amperes from as few as three of the electrodes. Thus, if the baking in one portion of the paste is lagging that in the remainder of the paste, the controller can reduce the current flow in selected electrodes 30 and direct the baking current to the other electrodes to cause the baking to even out.

In the embodiment where the central electrode comprises a plurality of segments spaced about the circumference of the central electrode, the controller is arranged to direct the current intended to flow to electrodes 30 located on one side of the baking zone through segments 11 that are also located on that same side of the baking zone. This arrangement prevents formation of current paths that originate at the central electrode on one side of the baking zone and then reverse direction to flow to an electrode 30 on the opposite side of the baking zone. Forcing the current to flow to the electrodes 30 of choice by this geometry results in faster response to changes in the current flow.

Figure 3:
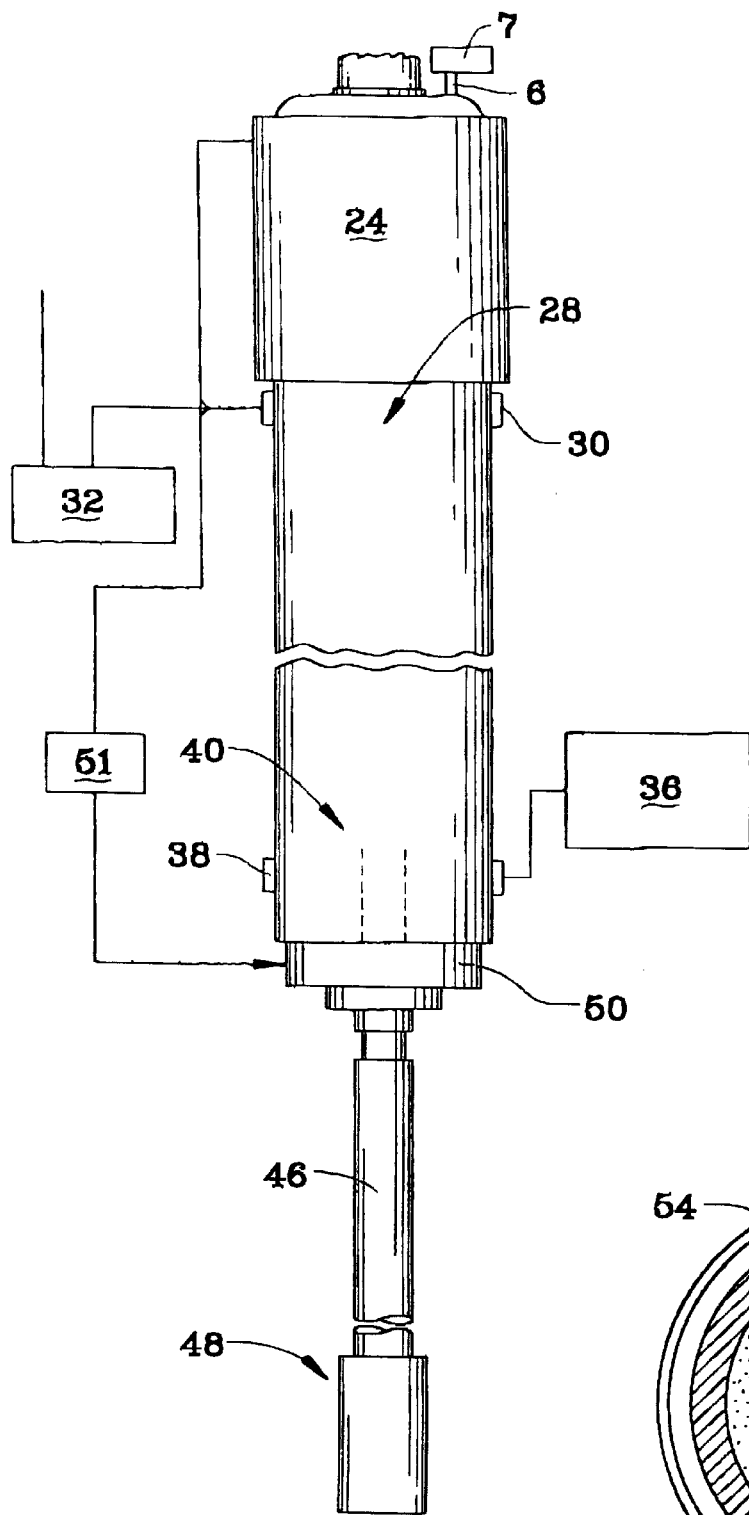
FIG. 3 is a side view of an apparatus similar to that shown in FIG. 3 wherein a hydraulic cylinder supports the electrode and a load cell provides data indicating the location of the baking zone.

FIG. 3 illustrates an embodiment where the article in the form of a cylindrical electrode is not supplied to a furnace directly. The electrode may, however, be used in an electric arc furnace not physically connected to the baking station. For example, the electrode may be made as described below, processed further chemically or physically, such as by machining and/or combination with other electrodes, and then transported to the furnace for use as an electrode with known equipment. Articles of other shapes and for other uses may be extruded by the same techniques, as well.

As noted above the magnitude of the force arising from adhesion between the baked paste and the sides of the container, which includes the frictional force, is a good indicator of the longitudinal location of the baking zone. The force of adhesion on a sixteen-inch diameter electrode has been determined to be 22 to 85 pounds per square inch of contact area between the baking zone of the electrode and the housing. This provides 21,000 to 82,000 pounds of resistance to movement of the electrode.

The preferred technique, shown in FIG. 3, for controlling the position of the baking zone is to detect very small changes in the slipping rate and adjust the pressure of the paste to achieve the desired slipping rate. Thus, it may be determined that for a given baking power input a slipping rate of seven inches per hour is to be expected. The paste pressure is then set to obtain that nominal slip rate. The actual slipping rate is measured by placing a load cell between the bottom of the extruded article and a shaft that engages the load cell and moves at the expected rate. In the embodiment of FIG. 3, the baked article 40, which in the drawings is in the shape of an electrode, is supported on a shaft 46 of a hydraulic cylinder 48. The hydraulic cylinder is controlled to move at the expected slipping rate, for example, by a solenoid-activated valve. The force applied to the shaft by the article is detected by a load cell 50. An increasing force detected by the load cell as it moves away from the housing 24 at the expected slipping rate indicates that slipping rate is greater than expected, which indicates that the baking zone is shrinking and providing smaller adhesion forces. A decreasing force indicates the opposite. The load cell may be placed at other locations and be other types of devices, depending on the mode of engagement between the shaft and the baked article. In the embodiment of FIG. 2, where slipping shoes are used to support the electrode, the compression load cell 50 my be replaced by a tensional load cell. Further the hydraulic cylinder can as well be a ball-screw, rack-and-pinion, or like mechanism capable of providing a resisting force at a controlled rate of movement.

In the preferred embodiment, the hydraulic cylinder 48 provides a substantial force resisting advancement of the electrode while still permitting advancement of the electrode at a predetermined rate. For example, the resistance force provided by the hydraulic cylinder may be 7,000 pounds, and the slipping rate may be seven inches per hour. If the resisting force on a sixteen-inch diameter electrode is 7,000 pounds, the pressure on the unbaked paste must be 7,000 pounds divided by the cross-sectional area of the electrode to overcome this resisting force. Thus, the pressure in the paste must overcome the adhesion force noted above plus the 7000 pound additional resisting force. This increased pressure produces an article that has been found to have the superior physical and electrical properties discussed above.

Changes in the adhesion forces between the housing and the baked paste are detected very quickly in the FIG. 3 embodiment because the load cell is inelastic. Thus, movement of the load cell away from the article is sensed almost instantaneously, and the control system 51 increases the pressure applied to the paste until the predetermined force is attained, indicating that the desired extrusion rate has been again achieved. Similarly, if the adhesion forces decrease, the extruded article will push harder against the load cell, which will be sensed by the load cell, and the controller 51 will reduce the pressure on the paste.

The above describes a situation where changes in the location of the bake zone are small and can be corrected by relatively small changes in the pressure of the paste. This situation occurs when the baking rate and the extrusion rate essentially match. If these rates do not match, however, the rate of extrusion or the baking rate must be adjusted. The baking rate is changed by altering the energy applied to the bake zone and depends on the method of heating being used. If the method of heating is resistance ($I^2R$) heating, the current though the paste is reduced. If the method of heating is inductive, the current in the induction coils is reduced.

In the embodiment of FIG. 3, the baking rate and the slipping rate are varied in stepwise fashion, and the pressure on the paste is continuously varied. It is also possible to vary the slipping and baking rates continuously, however.

| Force on load cell | Cause of change in forces on load cell | Short term correction | Long term correction |
|---|---|---|---|
| Increases | Bake zone is shrinking and extrusion rate is increasing | Reduce paste pressure to maintain set extrusion rate | Increase baking power or decrease set extrusion rate. |
| Decreases | Bake zone is growing and extrusion rate is decreasing | Increase pressure on paste to maintain set extrusion rate | Decrease baking power or increase set extrusion rate. |

Figure 4:
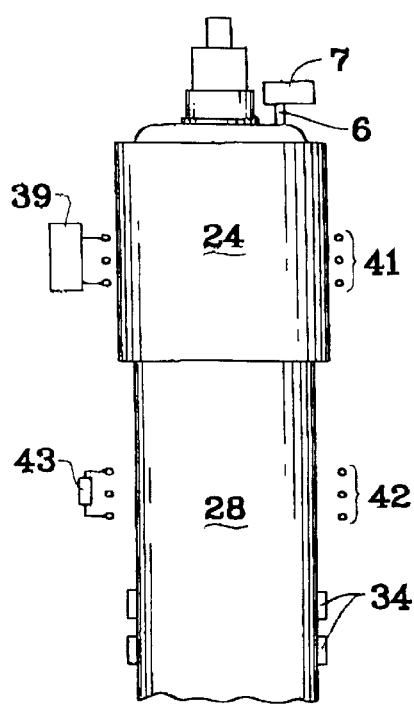
FIG. 4 is a side view of another embodiment of the invention wherein the partially-baked electrode is heated further by induction.

FIG. 4 illustrates another embodiment of the invention where induction heating is employed to bake the paste in the container and to bake further the extruded article. Thus, the pressure baking system 24 includes a container such as that shown in FIG. 1 that is capable of withstanding pressure and further that is made of inductively transparent materials. A preferred such material is the inductively-transparent, composite disclosed in U.S. Pat. No. 4,921,222. A first induction coil 41 carrying current supplied by source 39 is placed around the container near the exit end to heat the paste inductively by forming a baking zone. The baked article is extruded by the pressure of the paste as described above.

A second induction coil 42 carrying current from source 43 is located adjacent the extruded article after it has emerged from the pressure baking system to further bake the article. Inductive heating as shown in this figure may be used in conjunction with a furnace, similar to that shown in FIG. 2, or independent of a furnace, as shown in FIG. 3. Further, the location of the baking zone is controlled in the manner discussed with respect to FIG. 3 by controlling the slipping rate for a predetermined current through coils 41.

Figure 5:
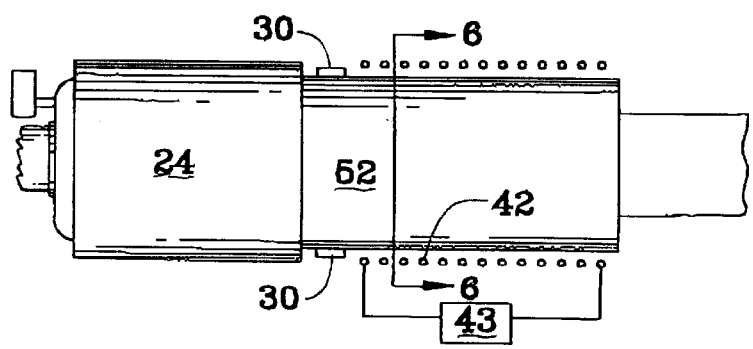
FIG. 5 is a side view of an embodiment of the invention wherein the electrode paste is converted to graphite by induction heating.
Figure 6:
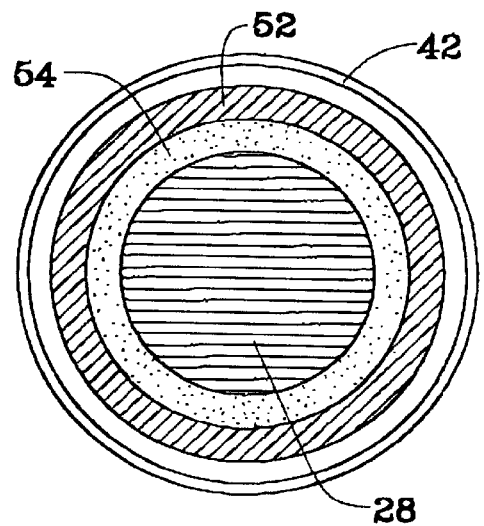
FIG. 6 is a cross section taken along line 6—6 of FIG. 5.

Inductive heating of the electrode is particularly useful when the baked carbon paste is to be converted to graphite, which requires the article to be heated to a temperature above 2500° C. for a predetermined period of time. This high temperature requires an energy source of significant size and high temperature insulation to reduce escape of heat from the hot electrode. FIGS. 5 and 6 illustrate a preferred embodiment for producing a graphite article.

In accordance with the embodiment shown in FIGS. 5 and 6, the electrode from the system 24 is extruded directly into an inductive heating station comprising an insulating, tubular structure 52 and an induction coil 42. The source of heat for baking in this embodiment is illustrated to be resistive, but it may be inductive as in FIG. 4, gas flame, or otherwise. The secondary heating, is preferably inductive, but may be others as well. When inductive heating is used, the tubular structure is made of materials that are transparent to the frequencies produced by the induction coil, whereby a major part of the energy produced by the coil is transmitted to the electrode to raise it to the desired temperature. In the preferred embodiment, the tubular structure 52 is made of a composite material comprising substantially continuous glass fibers and inorganic cement forming a matrix for the fibers as described in U.S. Pat. No. 4,921,222 (Mott).The length of the tubular structure is such that the transit time of the electrode through the structure is at least equal to the time required for achieving the desired temperature and converting the baked electrode paste to graphite. Thus, a cylindrical graphite article for use as an electrode or for other purposes exits the end of the tubular structure 52 opposite the housing 24.

FIG. 6 is a cross section taken along line 6—6 of FIG. 5 and illustrates the placement of insulation 54, such as carbon black, between the outer surface of the baked electrode and the inner surface of the tubular structure. The carbon black provides thermal insulation for the high temperature electrode and does not degrade at the high temperatures. The carbon black is maintained in the tubular structure by a seal placed at the end of the structure remote from the housing 24.

It will be appreciated that a unique system for providing a baked electrode to a furnace or for other purposes has been described. Modifications within the scope of the appended claims will be apparent to those of skill in the art.

I claim:

1. A method for making a carbonaceous article comprising the steps of:
   providing an inductively-transparent container having an inlet and an outlet,
   providing an induction coil,
   supplying carbonaceous paste to said container through said inlet,
   baking said paste in said container inductively by operating said induction coil to form a baking zone,
   extruding from said outlet baked paste that has been baked in said baking zone, and
   obtaining said article by detaching a portion of said baked paste.

2. A method according to claim 1 further comprising the further step of heating said baked paste extruded from said outlet.

3. A method according to claim 2 wherein said further step of heating comprises resistively heating said baked paste extruded from said outlet.

4. A method according to claim 2 wherein said further step of heating comprises inductively heating said baked paste extruded from said outlet.

5. A method according to claim 2 wherein said further step of heating said baked paste comprises converting said baked paste to graphite.

6. A method according to claim 5 wherein said further step of heating comprises inductive heating to a temperature of at least 2500° C.

7. A method according to claim 6 wherein said further step of heating said baked paste comprises the step of placing said baked paste in an inductively transparent container and providing insulation between said baked paste and said inductively transparent container.

8. A method according to claim 7 wherein said inductively transparent container comprises inductively transparent, substantially continuous fibers and inorganic cement forming a matrix for said fibers.

9. A method according to claim 1 wherein said container is capable of withstanding pressure and said step of supplying paste comprises providing said paste under pressure.

10. A method according to claim 1 further comprising the step of controlling the location of said baking zone.

11. A method according to claim 10 wherein said step of controlling the location of said baking zone comprises the step of controlling the longitudinal location of said baking zone at a plurality of peripheral locations of said baking zone.

12. A method according to claim 11 further comprising the steps of providing a first electrode in contact with an interior part of said paste and a plurality of second electrodes in contact with and peripherally spaced about an exterior part of said paste, and wherein said step of heating comprises establishing a flow of electric current between said first and second electrodes and through said paste and wherein said step of controlling the peripheral location of said baking zone comprises the step of measuring the temperature of said baking zone at a plurality of peripheral locations of said baking zone and controlling the flow of said current through said plurality of locations in response to the measured temperatures of said locations.

13. A method according to claim 10 wherein said container is capable of withstanding pressure and said step of supplying paste comprises providing said paste under pressure.

14. A method according to claim 13 wherein said step of controlling the position of said baking zone comprises maintaining a predetermined rate of extrusion of said baked paste.

15. A method according to claim 14 wherein the step of maintaining the rate of extrusion of said baked paste comprises the step of measuring said rate of extrusion and changing the pressure of said paste in response to changes in said rate of extrusion.

16. A method according to claim 15 wherein said step of measuring the rate of extrusion comprises the steps of engaging said baked paste with means for applying a force to said baked paste to resist the extrusion of said baked paste while maintaining a predetermined extrusion rate and detecting changes in the force applied to said baked paste by said means for applying.

17. A method according to claim 16 wherein said step of detecting changes comprises providing a substantially incompressible load cell between said baked paste and said means for applying a force.

18. A method for making a carbonaceous article comprising:
   providing a container,
   supplying carbonaceous paste to said container,
   heating said paste to form a baking zone in said paste,
   extruding baked paste from said container to form said carbonaceous article,
   determining the location of said baking zone, and
   maintaining the location of said baking zone at a desired location.

19. A method according to claim 18 wherein said step of maintaining comprises the step of altering said heating.

20. A method according to claim 18 wherein said step of maintaining comprises the step of altering said extrusion.

21. A method according to claim 18 wherein said location is a peripheral location.

22. A method according to claim 21 wherein said step of determining comprises the steps of measuring the temperature of said baking zone at a plurality of peripheral locations of said baking zone and altering said heating at said plurality of peripheral locations in response to said step of measuring.

23. A method according to claim 18 wherein said location is a longitudinal location.

24. A method according to claim 23 wherein said step of determining comprises determining the magnitude of a force arising from adhesion of said baked paste to said container.

25. A method according to claim 24 wherein said step of determining the magnitude of a force arising from adhesion comprises the step of applying pressure to said paste and measuring the rate of extrusion of said baked paste and said step of maintaining comprises changing the pressure applied to the paste in response to changes in said rate of extrusion.

26. A method according to claim 24 wherein said step of maintaining comprises the step of altering the rate of baking.

27. A method according to claim 18 further comprising the step of providing said baked paste to an electric arc furnace and supplying electric current to said baked paste for operation of said furnace.

28. A method according to claim 27 further comprising the step of continuously applying pressure to said carbonaceous paste.

29. A method according to claim 18 further comprising the step of continuously applying pressure to said carbonaceous paste.

30. A method for baking a carbonaceous article under pressure comprising:
providing a container having an inlet and an outlet,
supplying a carbonaceous paste to said container,
heating said paste to form a baking zone in said paste,
extruding said article through said outlet to form said carbonaceous article,
continuously applying pressure to said paste, and
controlling the location of said baking zone.

31. An apparatus for making a carbonaceous article comprising:
a container having an inlet and an outlet,
unbaked carbonaceous paste in said container,
means for heating said carbonaceous paste to form a baking zone in said paste,
means for extruding baked paste from said container, and
means for maintaining the location of said baking zone at a desired location.

32. Apparatus according to claim 31 wherein said means for heating comprises an electrode located within said unbaked carbonaceous paste and an electric circuit connected to said electrode.

33. Apparatus according to claim 31 wherein said means for heating comprises an induction coil.

34. Apparatus according to claim 31 wherein said means for maintaining the location of said baking zone comprises a plurality of electrodes spaced peripherally around an exterior part of said baking zone and an electric current controller connected to each of said electrodes.

35. Apparatus according to claim 34 wherein said means for maintaining the location of said baking zone comprises a central electrode having a plurality of conducting segments, and said electric current controller is connected to said segments.

36. Apparatus according to claim 31 wherein said means for maintaining the location of said baking zone comprises means for measuring the force required to extrude said baked paste.

37. Apparatus according to claim 36 wherein said means for measuring the force required to extrude said baked paste comprises a shaft applying a force to said baked paste resisting extrusion and a load cell between said baked paste and said shaft.

38. Apparatus according to claim 31 wherein said means for maintaining comprises means for controlling the rate of said extrusion.

39. Apparatus according to claim 31 wherein said means for maintaining comprises means for controlling said means for heating.

40. Apparatus according to claim 31 wherein said means for extruding comprises means for supplying said unbaked paste under pressure.

41. Apparatus for making a carbonaceous article comprising:
a pressure container having an inlet and an outlet;
unbaked carbonaceous paste in said container, said paste being under a pressure that is greater than atmospheric pressure;
a controllable paste pump connected to said inlet of said pressure container;
a first electrode in contact with the interior of said unbaked paste;
a second electrode in contact with the exterior of said unbaked paste;
a source of baking electric current connected between said first and second electrodes;
a shaft engaging baked paste emerging from said outlet and applying a force against said baked paste;
a load cell between said baked paste and said shaft; and
a feedback circuit connected between said load cell and said controllable paste pump.

42. Apparatus according to claim 41 further comprising an induction coil surrounding baked paste emerging from said outlet and a source of induction current connected to said coil, said induction current being sufficient to heat said baked paste to a temperature of at least 2500° C. and to maintain said baked paste at said temperature long enough to convert said baked paste to graphite.

43. Apparatus according to claim 42 further comprising an inductively transparent envelope and thermal insulation between said induction coil and said baked paste emerging from said outlet.

44. Apparatus according to claim 43 wherein said inductively transparent envelope is made of substantially continuous, inductively transparent glass fibers and an inorganic cement.

45. Apparatus comprising:
an inductively transparent enclosure;
baked carbonaceous paste in said enclosure;
thermal insulation between said enclosure and said paste;
an induction coil on the exterior of said enclosure; and
a source of induction current connected to said induction coil, said current being adequate to heat said paste to a temperature that will convert said baked paste to graphite.

46. Apparatus according to claim 45 wherein said inductively transparent enclosure is made of substantially continuous, inductively transparent glass fibers and an inorganic cement.

47. A method for making a carbonaceous article comprising the steps of:
providing a container having an inlet and an outlet,
supplying carbonaceous paste to said inlet,
baking said paste in said container by heating said paste to form a baking zone,
extruding from said outlet baked paste that has been baked in said baking zone,
converting said baked paste extruded from said outlet by inductively heating said baked paste extruded from said outlet to a temperature of at least 2500° C. by placing said baked paste in an inductively transparent container and providing insulation between said baked paste and said inductively transparent envelope; and
obtaining said article by detaching a portion of said baked paste.

48. A method according to claim 47 wherein said inductively transparent envelope comprises inductively transparent, substantially continuous fibers and inorganic cement forming a matrix for said fibers.

49. A method for making a carbonaceous article comprising the steps of:
providing an inductively-transparent container having an inlet and an outlet, providing an induction coil;

supplying carbonaceous paste to said container through said inlet, baking said paste inductively by operating said induction coil to form a baking zone, and extruding from said outlet baked paste that has been baked in said baking zone to make said article.

50. A method according to claim 49 further comprising the step of applying pressure to said paste.

51. A method according to claim 49 wherein said induction coil is on the exterior of said inductively transparent container.

52. Apparatus for making a carbonaceous article comprising:

an inductively-transparent container having an inlet adapted to receive carbonaceous paste, and an outlet, and an induction coil arranged with respect to said container to bake said paste in said container by forming a bake zone in said paste.

53. Apparatus according to claim 52 wherein said induction coil is on the exterior of said container.

* * * * *